May 3, 1966        S. S. BREWSTER        3,248,776
METHOD OF MAKING A SELF-ALIGNING ROD END BEARING
Filed March 23, 1964        2 Sheets-Sheet 1
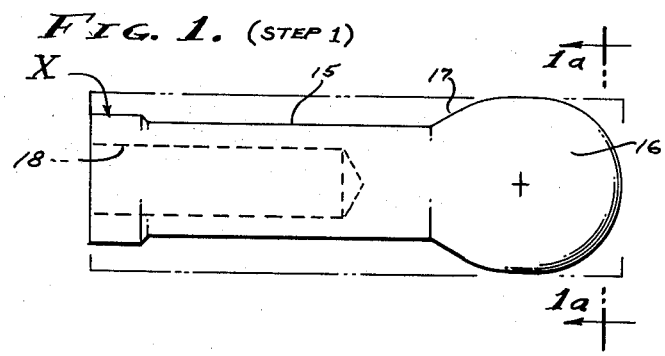
FIG. 1. (STEP 1)
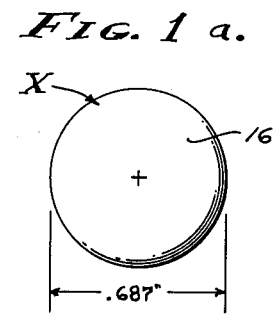
FIG. 1a.
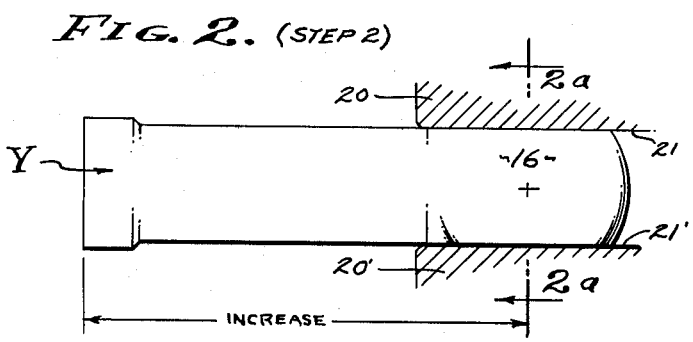
FIG. 2. (STEP 2)
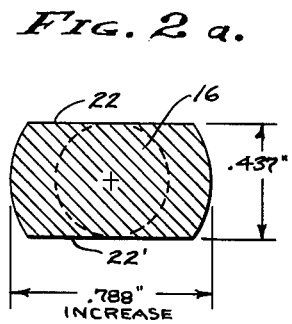
FIG. 2a.
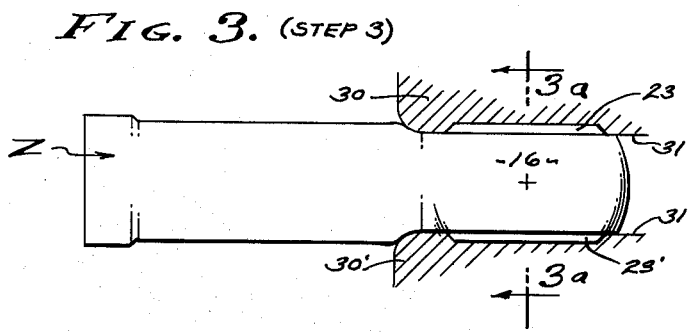
FIG. 3. (STEP 3)
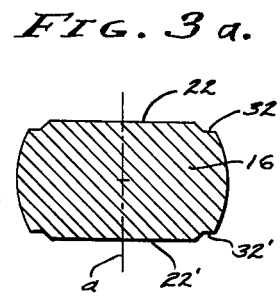
FIG. 3a.
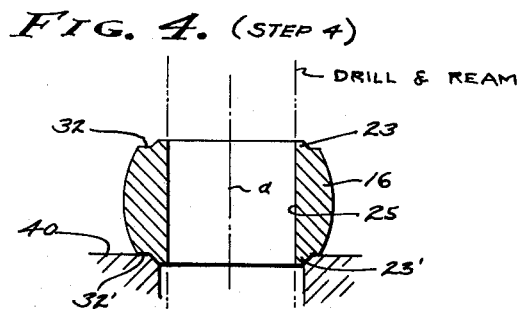
FIG. 4. (STEP 4)
INVENTOR.
SIDNEY S. BREWSTER
BY
W. H. Tunnell
AGENT May 3, 1966         S. S. BREWSTER         3,248,776
METHOD OF MAKING A SELF-ALIGNING ROD END BEARING
Filed March 23, 1964         2 Sheets-Sheet 2
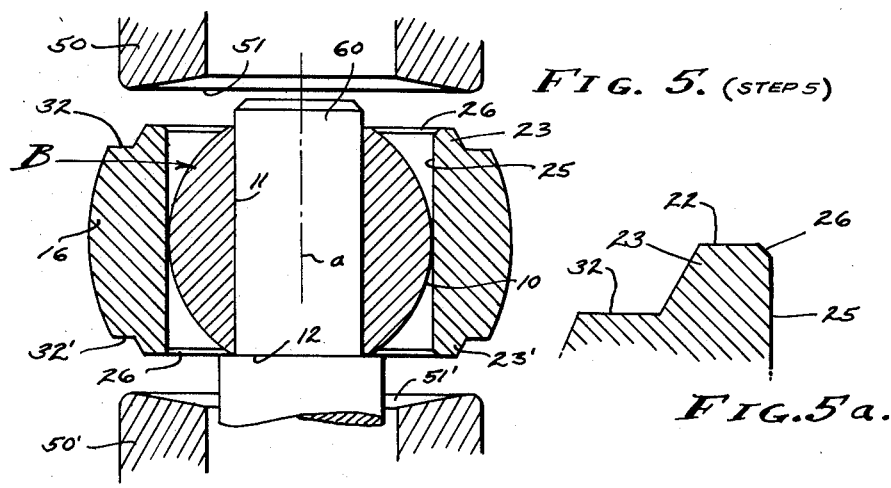
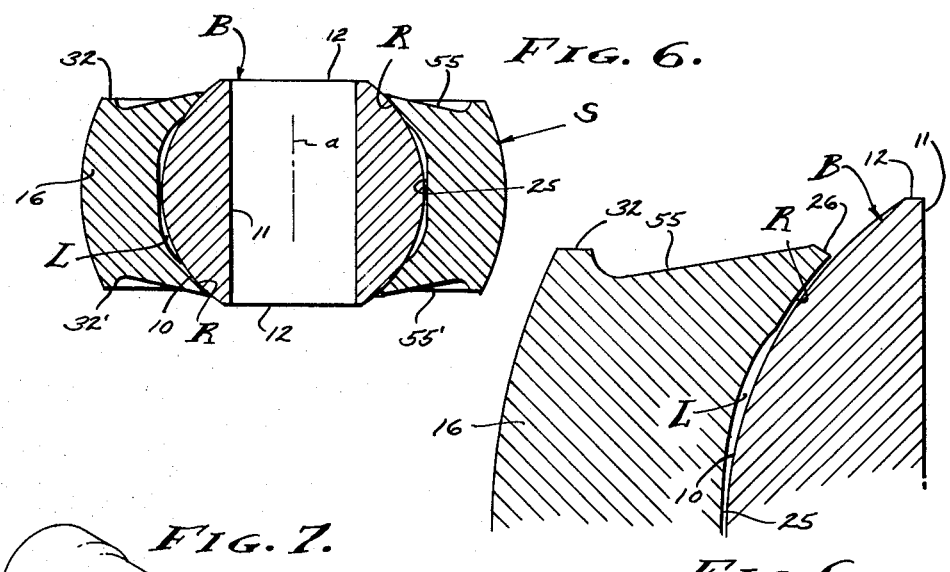
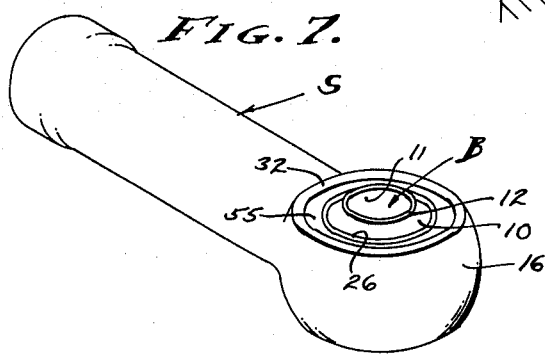
INVENTOR.
SIDNEY S. BREWSTER
BY
Agent United States Patent Office 3,248,776
Patented May 3, 1966

3,248,776
METHOD OF MAKING A SELF-ALIGNING
ROD END BEARING
Sidney S. Brewster, 5833 Towne Ave.,
Los Angeles 3, Calif.
Filed Mar. 23, 1964, Ser. No. 353,992
12 Claims. (Cl. 29—149.5)

This invention relates to self-aligning bearings of the spherical type wherein there are basically two elements, a ball part and a socket member. The art relating to this type of bearing suggests many ways in which to promote proper bearing clearance for anti-friction operation and for practicality. However, bearings of this type are usually rather expensive and are not always reliable and are usually characterized by complexity. For instance, additional parts are usually resorted to and/or complicated methods are resorted to in the manufacture.

Generally, the usual rod end bearing of the type under consideration involves a spherical part over which a socket member is swaged. The ball part is simple to manufacture and presents no major problem. However, the socket member is rather difficult to form in order to gain proper and desirable bearing engagement and clearance. Therefore, many such constructions utilize separate sleeves and various modes of assembly, and even then with not too great success when comparison is made to the usual cost of manufacturing such bearing units.

Without delving specifically into other structures and their modes of manufacture it is a general object of this invention to provide a practical method of making a two-piece bearing structure of the type under consideration, and to provide a method which results in a uniform product having predetermined bearing engagement and clearance.

It is an object of this method to provide a self-aligning two-piece bearing in which metals of high anti-friction properties are used respectively in the two associated parts and wherein high strength is reserved in both of said parts.

It is an object of this method to provide a bearing structure of the character herein referred to and wherein spaced annular bearing races are formed in the socket member for predetermined engagement and clearance with the ball part, and further with adequate clearance intermediate the races in order to retain lubricant therein when desired.

It is another object of this method to provide a bearing structure of the character hereinabove referred to and wherein accuracy of the spherical part is not interfered with, wherein machining operations are reduced to a minimum, and wherein the socket member is increased in strength in the process of forming the same over the first mentioned ball part.

It is still another object of this method to provide a rod end bearing wherein the socket member is made of a single piece of material stock of minimum size, thereby economizing the manufacture of the unit.

The various objects and features of this invention will be fully understood from the following detailed description of the typical preferred form and application thereof, throughout which description reference is made to the accompanying drawings, in which:

FIG. 1 is a view of the blank and illustrates step one of the method, while FIG. 1a is taken as indicated by section lines on FIG. 1.

FIG. 2 is a view of the strengthening and increased size of the blank and illustrates step two of the method, while FIG. 2a is taken as indicated by section lines on FIG. 2.

FIG. 3 is a view of the further strengthening and formation of locating means and illustrates step three of the method, while FIG. 3a is taken as indicated by section lines on FIG. 3.

FIG. 4 is a view of the formation of an opening through the blank and illustrates step four of the method.

FIG. 5 is an enlarged view of the final assembly and relationship of parts just prior to the formation of the bearing races which retain the ball part in the socket part, FIG. 5a being a fragmentary view of the critical cross-section.

FIG. 6 is an enlarged view of the finished assemblage and illustrates the ball and socket section, FIG. 6a being a fragmentary view of the critical cross-section.

FIG. 7 is a perspective view of the finished rod end bearing as produced by the foregoing steps.

The self-aligning bearing herein disclosed has many uses and is shown as a rod end bearing. Although prior art bearings have employed socket members swaged onto the ball part and have utilized intermediate bearing sleeves of babbit, lead, and synthetic bearing materials, the present invention is resolved into two simple parts, each formed of a material that when used together affords anti-friction movement and whereby increased strength is obtained in each of said two parts. As best illustrated in FIG. 7 of the drawings, the rod end bearing involves, generally, a ball part B and a socket part S. The ball member B is fashioned so that it can be secured to various other parts, as by means of a bolt or the like (not shown). The socket member S is fashioned so that it can be secured to a rod end (not shown). There are many possible installations for such a rod end bearing, the primary object being to provide a swivel or universal connection between the part secured to the ball B and the part or rod secured to the socket part S.

The ball part B is preferably a precision part made of a bearing steel, such as S.A.E. 52100 steel, which is formed as by turning, which is heat treated to high tensile strength, which is bored on an axis intersecting its center, and which is then ground to a true spherical configuration. A durable hard chrome finish is then deposited onto the spherical surface of the ball B, and in practice a dry lubricant is deposited on the surface of the ball. Thus, the ball part B is a true round part having a spherical convexly curved bearing surface 10, having a cylindrical bore 11 therethrough, and preferably with opposite end faces 12 surrounding the bore.

The socket member S is specially fabricated in accordance with the present invention and is preferably made of a tough and durable stainless steel, such as S.A.E. 321 stainless, which is processed according to the method as hereinafter described.

There are five steps involved in the manufacture and assembly of the socket member S around the ball part B. Firstly, a blank is made and preferably by machining it of minumum diameter bar stock. Secondly, the said blank is forged so as to strengthen and shape the same to increased size and desired proportions. Thirdly, the forged blank is coined so as to further strengthen portions thereof and so as to form locating means which makes for accuracy of succeeding method steps. Fourthly, the forged and coined blank is bored out as by drilling and reaming, and a chamfer is formed at each end of the bore. Fifthly, the socket member S as prepared according to steps one through four, enumerated above, is assembled with a ball part B and swaged at opposite ends of the bore so as to form a pair of spaced circular bearing races R engaged with the ball part and with a lubricant carrying chamber L between the races.

The first step of the method involves the formation of a blank X having features adapted to establish the configuration of the socket member S. In practice, the blank X is turned from bar stock of minimum diameter, for example 11/16″ diameter, to have a cylindrical shank 15 and a spherical enlargement 16 at the end thereof where the socket per se is to be formed. As is shown, the spherical enlargement is faired into the shank 15 of .437″ diameter by a conical fillet 17, and there is a threaded opening 18 in the opposite end of the shank for the reception of a threaded rod end. This first machine operation is a forming step whereby the configuration of the socket member S is established.

The second step of the method involves formation of the blank X into a strengthened member Y of increased size and established general form, thereby work hardening the tough metal of the blank X and increasing the tensile strength thereof. This second step involves the application of pressure to diametrically opposite sides of the spherical enlargement 16 in order to increase the size, strengthen and flatten the same. In practice, cold forging is performed by use of a pair of dies 20 and 20′ that are moved into pressured engagement with the enlargement 16, with parallel faces 21 and 21′ moved approximately to the diameter of the shank 15. This second forging operation thereby increases the diameter of head 16 to approximately .788″ as shown in FIG. 2a. Also, this forging operation increases the distance to the remote end of the shank 15. And, together with increase in size from substantially smaller diameter bar stock there is advantageous flow of material in the areas of the bearing races to be formed and work hardening of said material in said areas.

The third step of the method involves depression and/or compression of certain areas of the forged blank Y. This step is a coining operation whereby opposite parallel sides 22 and 22′ of member Y are depressed in a circle encompassing frusto-conical projections 23 and 23′ left remaining at the opposite parallel sides 22 and 22′. In practice, cold coining is performed by use of a pair of dies 30 and 30′ that are moved into pressured engagement with the opposite faces 22 and 22′. The dies 30 and 30′ are conically concaved with parallel end faces 31 and 31′ moved approximately as shown so as to establish opposite recessed and circular faces 32 and 32′ with the projections 23 and 23′ extending centrally therefrom to the faces 22 and 22′. Said projections 23 and 23′ project concentrically on a central axis $a$ which is normal to the sides 22 and 22′. The cones are alike and preferably formed at an angle as shown, more or less, with the truncation occurring in planes parallel with the underlying recess faces 32 and 32′ and so that the diameter of the truncation is greater than the major diameter of the ball part B. Thus, the member Z is established and which is characterized by a work hardened head 16 of increased size and of increased tensile strength. In practice, the said formation by forging and/or coining (as it may be termed) is performed at room temperature and with the result that the blank X is materially strengthened in the process of formation into the member Z, said strengthening being localized mainly in the area of the member which is to be formed into the bearing races R.

The fourth step of the method involves removal of a major portion of the flattened head as previously formed in establishing the member Z. This fourth step is preferably a drilling and reaming operation performed concentrically with the axis $a$ and to the oppositely projecting truncated cones or projections 23 and 23′. In accordance with the invention one or more of the cones 23–23′ is used for concentric location and the head is bored at 25 to a diameter slightly in excess of the diameter of the ball part B. As shown in FIG. 4 a conically chamfered centering die 40 is provided to support and centrally locate the head 16. At each opposite end of this bore 25 there is a chamfer 26 disposed at about 45° and which chamfers extend to the faces 22 and 22′, respectively. Thus, the center of the head 16 is removed and in practice this bore 25 is smoothed as by reaming and/or honing in order to provide a socket member having a bearing surface suitable for sliding engagement with the ball part B.

The fifth and final step of the method involves a swaging, or reforging of the remaining portions of the two conical projections that have had the center removed therefrom. This fifth step is performed with the ball part B held in place in the member Z prepared as hereinabove prescribed, and it is essentially a coining step which further work hardens and increases the tensile strength of the finally formed socket member S. From the drawings it will be seen that previously formed projections 23 and 23′ are deflected and/or bent by pressure or force applied axially so as to depress the metal and cause it to flow radially inward and thereby encircle the ball part B at two independent and spaced races R to capture the ball in working position.

Essentially, this last step is one of coining wherein metal is displaced from one area and is caused to flow to another area. In the case illustrated a pair of dies 50 and 50′ moved into pressured engagement with the remaining portions of the projections 23 and 23′. The opposed faces 51 and 51′ of the dies are inwardly dished with gentle peripheral radii. Thus, by applying said dies to the opposite sides 22 and 22′ of the member Z and by limiting the movement of said dies, a peripheral depression 55 and 55′ is formed in each side 22 and 22′ respectively, surrounding the bore 25. In practice, the bending of the projections 23 and 23′ is gentle and gradual with an inherent tendency to follow the configuration of the ball part B. As a result, the inner diameter of the bore 25 becomes spherically concaved in the area of each projection 23 and 23′ and with spaced independent circular surfaces juxtapositioned to the spherical surface of said ball part B. From FIGS. 5 through 6a of the drawings it will become apparent how the projecting material is coined and thereby pressed against the surface of the ball part B. In practice this engagement is localized so as to form a pair of circular rails, as shown, and the inherent spring back of the material so depressed causes a clearance as best shown in FIG. 6a. It is these two circular rails with clearance as shown which form the two bearing races R, each having continuous flat and sliding contact with the surface 10 of the ball.

From the foregoing it will be seen that easily performed steps are involved in the formation and assembly of the two part bearing that is produced. It is a simple matter to procure bar stock material as specified and to machine the same according to the first step of the invention, thereby providing a blank X with a spherical enlargement. It is then feasible to flatten said enlargement which strengthens the same by work hardening and to coin the flattened enlargement so as to increase tensile strength and so as to provide the centering cones. It is then a practical matter to perform the step of drilling and reaming, even though the tough material of the socket part S is substantially hardened at the peripheral portions of the head 16, said bore 25 being directed through the center of the head 16 which is least hardened. Finally, it is a simple matter to hold the ball part B in proper working position as shown in FIG. 5 as by means of a shouldered pin 60 over which the dies 50 and 50′ move in order to engage the faces 22 and 22′ surrounding the bore 25 and ball part B. It is significant that the compression of the enlargement 16 into the flattened head shown on the member Y results in a grain structure paralleling the sides 22 and 22′ at and adjacent the bore 25. Therefore, upon reapplication of pressure applied in step 5 of the method, the said grain is disposed in the desired direction to continue flow and to the end that the last mentioned coining step directs the flow radially inward. Thus, the ball part B is used as a guide to direct and to limit the flow of socket member metal, as it is coined, and when said step five is completed and the dies removed the natural springback in the material establishes a positive clearance for freedom of the ball part B within the socket member that has been formed as hereinabove described.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. The method of making a ball and socket type self-aligning rod end bearing of the character described, and comprising:
    (a) forming a socket member with a cylindrical bore opening at a face normal to the axis of said bore,
    (b) placing a ball part within said bore and with its periphery projecting from said face,
    (c) and coining the member in an area surrounding the ball part through axial engagement of an inwardly dished die applying pressure axially and radially inwardly, causing the said area surrounding the ball part to form radially inward from the bore into an independent circular bearing surface to engage the ball part.

2. The method as set forth in claim 1 and wherein the socket member has opposite parallel faces normal to the axis of said bore, and the said coining of the member is applied identically to said opposite faces.

3. The method of making a ball and socket type self-aligning rod end bearing of the character described, and comprising:
    (a) forming a socket member with a conical projection so as to gain volume of material for displacement; and with a cylindrical bore disposed on the axis of said projection to thereby truncate the same,
    (b) placing a ball part within said bore and with its periphery projecting from said truncation,
    (c) and coining the member in said conical area surrounding the ball part through the axial engagement of inwardly dished die applying pressure axially and radially inwardly to said conical projection, causing said conical projection surrounding the ball part to form radially inward from the bore into an independent circular bearing surface to engage the ball part.

4. The method as set forth in claim 2 and wherein the socket member has oppositely disposed conical projections, and the said coining of the member is applied identically to said opposite conical projections.

5. The method of making a ball and socket type self-aligning rod end bearing of the character described, and comprising:
    (a) forming a socket member with a flat face,
    (b) forming a circular depression in said face in order to compress and thereby strengthen the material which underlies the depression and in order to establish a central unstrengthened projection within said circular depression,
    (c) forming a cylindrical bore through the socket member on an axis normal to said flat face and substantially removing said unstrengthened projection,
    (d) placing a ball part within said bore and with its periphery projecting from said flat face,
    (e) and coining the member in the area surrounding the bore through the axial engagement of an inwardly dished die applying pressure axially and radially inwardly to the remaining portion of the central projection, thereby to cause movement of and strengthening the material surrounding the ball part to form radially inward into an independent circular bearing surface to engage with the surface of the ball part.

6. The method as set forth in claim 5, and wherein the socket member has opposite parallel and flat faces normal to axis of said bore and said coining of the member is applied identically to said opposite faces.

7. The method of making a strengthened ball and socket type self-aligning rod end bearing of the character described, and comprising:
    (a) forming a blank with a shank and a spherically enlarged head at one end thereof,
    (b) forming said blank into a socket member by flattening said spherical head so as to strengthen and elongate the same from said end and to have a flat face,
    (c) forming a bore in said flattened head on an axis normal to said face,
    (d) placing a ball part within said bore and with its periphery projecting from said face,
    (e) and coining the member in an area surrounding the ball part through the axial engagement of an inwardly dished die applying pressure axially and radially inwardly, causing the said area surrounding the ball part to form radially inward from the bore into an independent circular bearing surface to engage the ball part.

8. The method as set forth in claim 7 and wherein the socket member has opposite parallel faces normal to the axis of said bore, and the said coining of the member is applied identically to said opposite faces.

9. The method of making a strengthened ball and socket type self-aligning rod end bearing of the character described, and comprising:
    (a) forming a blank with a shank and a spherically enlarged head at one end thereof,
    (b) forming said blank into a socket member by flattening said spherical head so as to strengthen and elongate the same from said end and to have a conical projection so as to gain volume of material for displacement and with a cylindrical bore disposed on the axis of said projection to thereby truncate the same,
    (c) placing a ball part within said bore and with its periphery projecting from said truncation,
    (d) and coining the member in said conical area surrounding the ball part through the axial engagement of an inwardly dished die applying pressure axially and radially inwardly to said conical projection, causing said conical projection surrounding the ball part to form radially inward from the bore into an independent circular bearing surface to engage the ball part.

10. The method as set forth in claim 9 and wherein the socket member has oppositely disposed conical projections, and the said coining of the member is applied identically to said opposite conical projections.

11. The method of making a strengthened ball and socket type self-aligning rod end bearing of the character described, and comprising:
    (a) forming a blank with a shank and a spherically enlarged head at one end thereof,
    (b) forming said blank into a socket member by flattening said spherical head so as to strengthen and elongate the same from said end and to have a flat face,
    (c) forming a circular depression in said face in order to compress and thereby strengthen the material which underlies the depression and in order to establish a central strengthened projection within said circular depression,
    (d) forming a cylindrical bore through the socket member on an axis normal to said flat face and substantially removing said unstrengthened projection,
    (e) placing a ball part within said bore and with its periphery projecting from said flat face,
    (f) and coining the member in the area surrounding the bore through the axial engagement of an inwardly dished die applying pressure axially and radially inwardly to the remaining portion of the central projection, thereby to cause movement, and strengthening of the material surrounding the ball part to form radially inward into an independent circular bearing surface to engage with the surface of the ball part.

12. The method as set forth in claim 11, and wherein the socket member has opposite parallel and flat faces, and the said coining of the member is applied identically at said opposite flat faces.

References Cited by the Examiner

UNITED STATES PATENTS

| | | | |
|---|---|---|---|
| 1,452,535 | 4/1923 | Sultemeyer | 29—148.4 |
| 2,126,912 | 8/1938 | Murden | 29—148.4 |
| 2,613,429 | 10/1952 | Dierbeck | 29—148.4 |
| 2,728,975 | 1/1956 | Potter | 29—149.5 |
| 2,892,246 | 6/1959 | Mansfield | 29—149.5 |
| 2,947,063 | 8/1960 | Teeple | 29—149.5 |
| 2,958,927 | 11/1960 | Kravats | 29—441 |
| 3,110,953 | 11/1963 | Messerschmidt | 29—148.4 |

WHITMORE A. WILTZ, *Primary Examiner.*

THOMAS H. EAGER, *Examiner*